(12) United States Patent
Scully et al.

(10) Patent No.: US 11,494,859 B2
(45) Date of Patent: Nov. 8, 2022

(54) SYSTEM AND METHOD FOR IMPLEMENTING CUSTOMIZABLE RULES FOR ASSOCIATING LEGAL ENTITIES OR OTHER ATTRIBUTES WITH APPLICATIONS AND DEPLOYMENTS

(71) Applicant: JPMorgan Chase Bank, N.A., New York, NY (US)

(72) Inventors: Alan Scully, Tokyo (JP); Justin Clarke, St. Ives (AU); Elliott Adler, Teaneck, NJ (US); SonasalaMuthu Kuppusamy, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 38 days.

(21) Appl. No.: 17/139,096

(22) Filed: Dec. 31, 2020

(65) Prior Publication Data
US 2021/0201429 A1    Jul. 1, 2021

Related U.S. Application Data

(60) Provisional application No. 62/955,503, filed on Dec. 31, 2019.

(51) Int. Cl.
*G06Q 50/18* (2012.01)
*G06F 3/0482* (2013.01)

(52) U.S. Cl.
CPC .......... *G06Q 50/18* (2013.01); *G06F 3/0482* (2013.01)

(58) Field of Classification Search
CPC .............................. G06Q 50/18; G06F 3/0482
See application file for complete search history.

(56) References Cited

U.S. PATENT DOCUMENTS

| | | | | |
|---|---|---|---|---|
| 8,311,960 | B1* | 11/2012 | Ginzburg | G06N 20/00 706/13 |
| 8,713,023 | B1* | 4/2014 | Cormack | G06F 16/93 707/740 |
| 9,922,328 | B2* | 3/2018 | Kumar | G06Q 40/12 |
| 2012/0066253 | A1* | 3/2012 | Osborn | G06Q 30/0281 707/769 |
| 2014/0172728 | A1* | 6/2014 | Lenkov | H04L 63/08 705/310 |
| 2018/0330821 | A1* | 11/2018 | Kano | G16H 50/20 |
| 2019/0095557 | A1* | 3/2019 | Sehgal | G06F 30/20 |
| 2020/0117829 | A1* | 4/2020 | Barday | G06F 21/6245 |

* cited by examiner

*Primary Examiner* — Beau D Spratt
(74) *Attorney, Agent, or Firm* — Greenblum & Bernstein, P.L.C.

(57) ABSTRACT

An embodiment of the present invention is directed to allowing permissioned legal entity managers to define rules for a legal entity to derive an association of an application with a legal entity. The application manager may then be presented with an option to accept suggested associations or perform an override. Once a legal entity is ready, applications may be published to a system of record. Due to the vast amount of applications and entities available, the solution provides automation while still allowing overrides. The results of the classification may then be stored in a system of record and data quality suggestions sent to the source systems to clean source system data. An embodiment of the present invention may also associate other attributes to applications and deployments.

18 Claims, 17 Drawing Sheets

| Country: | AUSTRALIA v | | Inventory Management | | 1st Variance Report | | Inventory: | AU-Country Inventory | | Sav Config | | Audit Trail | | Add Inclusions | | Load Data | | Attest (AU) v | | 0 |

Selected rows count: 0

◁ < 1 2 3 4 5 > >І 20v   Total records: 1534, Total pages: 77 Last query took 25.474 seconds.

| Selection | Application ID | Application LOB | CTO | TGO | Application Name | Application State | Confirmed Membership | Pending Review? | Reason | Meets Crieria? | Proposed Membership |
|---|---|---|---|---|---|---|---|---|---|---|---|
| All v | | All v | | | | All v | All v | All v | All v | All v | All |
| ☐ | 1xxx0 | CT | Clark, A | Risk and Forecasting Solutions | REMEDY - Remedy Web Matrix Pricer | Operate | Retain | N | | Y | Retain |
| ☐ | 1xxx0 | CIB | Smith, M | Mkts-Execution-Research & Analytics | Transmit | Operate | Retain | N | | Y | Retain |
| ☐ | 1xxx1 | CCB | Peters, S | OPT - CTO | International and Domestic Collection Sys | Operate | Retain | N | | Y | Retain |
| ☐ | 1xxx2 | CIB | Holmes, C | Banking-IDL, FX, QE, UI & Glas (###) | LION | Operate | Retain | N | | Y | Retain |
| ☐ | 1xxx1 | CIB | Hanson, C | Banking-IDL, FX, QE, UI & Glas (###) | Payment Search Utility (AKA FTMon) | Operate | Retain | N | | Y | Retain |
| ☐ | 1xx1 | AWM | Watson, P | AM: Fixed Income & Liquidity | ICES | Operate | Retain | N | | Y | Retain |

| Country: | AUSTRALIA ⌄ | | ≡ Inventory Management | ☐ Variance Report | Inventory: | AU-EI2-Critical Applications ⌄ | | ☐ Save Config ⌄ |
|---|---|---|---|---|---|---|---|---|
| Selected rows count: 0 | | | | | | | >\| 20 ⌄ | |
| | | | | | AU-Country Inventory | | | |
| | | | | | AU-EI1-Cust Data or Material | | | |
| Selection | Application ID | Application LOB | TGO | | AU-EI2-Critical Applications | | Application State | |
| | | | | | AU-EI3-Appendix 18 | | | |
| | | | | | AU-EI4-empty | | | |
| All ⌄ | | All ⌄ | | | AU-EI5-empty | | All ⌄ | |
| | | | | < | | > | | |
| ☐ | 8xx0 | CIB | Mkts-Macro-Rates (5###1) | | xxxxxxx | | Operate | |
| ☐ | 9xx0 | CIB | Banking-Global Client Access (5###8) | | MHS - Message Handling System | | Operate | |

Figure 5

| Country: | JAPAN v | | Inventory Management | 1st Variance Report | Inventory: | JP-EI2-Japan Inventory v | Sav Config v | Audit Trail | LE Association | Load Data | Attest (JP-EI2) v |

Selected rows count: 0    |< < 1 2 3 4 5 > >| 20 v    Total records: 1837; Total pages: 92 Last query took 13.816 secon

| Application State | Legal Entity ID | Legal Entity Name | Confirmed Membership | Pending Review? | Reason | Meets Criteria? | Proposed Membership | Follow Up | Selection |
|---|---|---|---|---|---|---|---|---|---|
| All v | | All v | All v | All v | All v | All v | All v | All v | All v |
| Operate | 1xxs6 | Bank A, N.A. – Tokyo Branch | Retain | N | | Y | Retain | | |
| Operate | 8xxs2 | Bank A Securities Japan Co., Ltd. | Retain | N | | Y | Retain | | |
| Operate | 8xxx2 | Bank A Securities Japan Co., Ltd. | Retain | Y | Entry no longer meets the criteria | N | Exclude | | |
| Operate | 8xxx2 | Bank A Securities Japan Co., Ltd. | Retain | N | | Y | Retain | | |
| Operate | 8xxx2 | Bank A Securities Japan Co., Ltd. | Retain | N | | Y | Retain | | |
| Operate | | | | Y | No Deployment/ LE mappings | Y | Add LE association | | |
| Operate | 8xxx2 | Bank A Securities Japan Co., Ltd. | Retain | N | | Y | Retain | | |
| Operate | 1xxx6 | Bank A, N.A. – Tokyo Branch | Retain | N | | Y | Retain | | |
| Operate | 8xxx2 | Bank A Securities Japan Co., Ltd. | Retain | N | | Y | Retain | | |
| Operate | 1xxx6 | Bank A, N.A. – Tokyo Branch | Retain | N | | Y | Retain | | |
| Operate | 8xxx2 | Bank A Securities Japan Co., Ltd. | Retain | N | | Y | Retain | | |
| Operate | 1xxx6 | Bank A, N.A. – Tokyo Branch | Retain | N | | Y | Retain | | |

Popup menu:
- ○ Accept proposal to remove retain
- ○ Override to include although does not meet criteria
- ○ LE association
- ○ Show in regional compliance report
- ○ Show in SEAL
- ○ Show RDMS Data
- ○ Export data to CSV

Figure 6

Application Rows                                                                                                     ×

|< < 1 2 3 4 5 > >| 15 v     Total records: 337, Total pages: 23

| Selection | Automated Action | Rationale | Manages Customer Data? (Q316) | Japan CCI | Japan CCI (EI) | Application ID | Application LOB | TGO | Application Name | Application State | Deployment ID | Deployment Name | Legal Entity ID | Legal Entity Name |
|---|---|---|---|---|---|---|---|---|---|---|---|---|---|---|
| All | | | All | | | | | | | All v | | | | |
| ✓ | Auto Remove | Removing retain as entry no longer meets criteria. | N | N | N | 1xx0 | CIB | Mkts-O | NEX Group – BrokerTec | Operate | 1xx4 | BrokerTec (TT) – TOK | 8xxx2 | Bank A Securities Japan |
| ✓ | Auto Remove | Application Decommissioned. | N | Y | Y | 4xx0 | CB | CB Sal | CB Client Reference Database | Decommissioned | 6xxx7 | CB Client Reference Database | 1xxx6 | Bank A, NA. |
| ✓ | Auto Remove | Application Decommissioned | N | Y | Y | 7xx0 | CIB | Bankin | Global Trade System | Decommissioned | 5xxx8 | Global Trade System Asia | 1xxx6 | Bank A, NA |
| ✓ | Auto Remove | Application Decommissioned. | N | N | N | 1xxx0 | CIB | Mkts-E | PUMA | Decommissioned | 6x1 | PUMP AP | 1xxx6 | Bank A, NA |
| ✓ | Auto Remove | Application Decommissioned. | N | Y | Y | 1xxx8 | CT | Treasu | Trade Entry Application | Decommissioned | 6xxx2 | Trade Entry Application 6xx8 | 1xxx6 | Bank A, NA |

Figure 7

| Audit Trail | | | | | | | | | × |
|---|---|---|---|---|---|---|---|---|---|
| | | | | | | | | Total records: 352, Total pages: 18 | |
| | | | | | |< < 1 2 3 4 5 > >| 20 v | | | |
| App ID | Deployment ID | Deployment Name | LE ID | LE Name | Confirmed Membership | Added By | Timestamp | Added Comments | App Name |
| | | | | | All v | | | | |
| 8xxx5 | 5xxx2 | A_ APAC Fixed Income Deployment | 1xx1 | Bank A, N.A. - Sydney Branch | Removed Override to include ... | 1xxxx7 | Dec 17, 2019, 5:21:29 PM | APAC Fixed Income deployment is decom and replaced by 3 other deployments | A_ Rate |
| 8xxx5 | 5xxx3 | A_ Securities Deployment | 1xx1 | Bank A, N.A. - Sydney Branch | Override to include ... | 1xxxx7 | Dec 17, 2019, 5:20:10 PM | A_ Rates now uses 3 deployments following decom of APC Fixed Income deploy | A_ Rate |
| 8xxx5 | 5xxx1 | A_ Rates Non-linear Deployment | 1xx1 | Bank A, N.A. - Sydney Branch | Override to include ... | 1xxxx7 | Dec 17, 2019, 5:19:49 PM | A_ Rates now uses 3 deployments following decom of APC Fixed Income deploy | A_ Rate |
| 8xxx5 | 5xxx0 | A_ Rates Swaps Deployment | 1xx1 | Bank A, N.A. - Sydney Branch | Override to include ... | 1xxxx7 | Dec 17, 2019, 5:19:28 PM | A_ Rates now uses 3 deployments following decom of APC Fixed Income deploy | A_ Rate |
| 9xxx0 | 6xxx3 | Fund Accounting OTC Derivatives Valuation | 1xx1 | Bank A, N.A. - Sydney Branch | Retain | 1xxxx7 | Dec 2, 2019, 10:28:37 AM | Required due to criticality to Securities Services Business. Follow-up on ARC Q316 req- | Fund Acct |
| 8xxx5 | 6xxx1 | Transfer Agency Portal – Deployment | 1xx1 | Bank A, N.A. - Sydney Branch | Retain | 1xxxx7 | Dec 2, 2019, 6:07:54 AM | Required to support Securities Services business | Transfer |
| 2xx0 | 5xxx6 | CMPP – MXI – Master FX Instructions | 1xx1 | Bank A, N.A. - Sydney Branch | | 1xxxx7 | Dec 2, 2019, 6:06:37 AM | All users associated with Sydney Branch | MXI |

Figure 8

| Country | Japan ⌄ | Inventory | JP-Country Inventory ⌄ | | 🖫 Save Config | ⊕ Add Inclusions | ≡ Audit Trail | Automated 910 Rules | ⊞ Load Data | ⌀ Attest (JP) ⌄ | ⊕ | ⚙ |
|---|---|---|---|---|---|---|---|---|---|---|---|---|

Selected rows count: 0    ⊲⊲ ⊲ 1 2 3 4 5 ⊳ ⊳⊳ | 10 ⌄    Total records: 1859, Total pages: 186    Last query took 11.186 seconds.

| Application ID | Application Name | Application LOB | TGO | Application State | Confirmed Membership | Last Updated Comments | Pending Review? | Reason |
|---|---|---|---|---|---|---|---|---|
| | | All ⌄ | | All ⌄ | All ⌄ | | All ⌄ | All |
| 1x20 | S-card | CIB | Mkts-Macro-Rates (S5xx41) | Operate | Retain | Import | N | |
| 1x50 | N Group – BrokerTec | CIB | Mkts-CTS-Market Trading Venues (S5xx36) | Operate | Retain | Import | N | |
| 1x00 | RDT-Counterparty Account Set up System (CAS | CT | Global Reference Data Technology | Operate | Retain | Import | N | |
| 1x70 | SI Tools | CIB | Mkts-Spread-Credit (S5xx65) | Operate | Retain | Retain due to user %exist. Follow up with user to compl | N | |
| 2x90 | Nasdaq ES | CIB | Mkts-CTS-Market Trading Venues (S5xx6) | Operate | Retain | Import | N | |
| 3xx0 | Cxx – Credit Surveillance Report | CT | Risk and Forecasting Solutions | Decomm. | Override to include application | There are still users of this. To follow up with Users/AO | N | |
| 4xx0 | Customer and Bank Data | CIB | PTT-DFX & Accounting-DFX Processing (S5xx2) | Operate | Retain | Import | N | |

Figure 9

Applicable Rules * 1010

EXCLUDE - Decommissioned Application [Remove Retain/Remove Override] x
EXCLUDE - Retired Application - Was override to exclude [Remove Override] x
EXCLUDE - Retired Application - No indicators of continued usage [Remove Retain] x
+8

| UnSelect All  1012 | Save Applied Rules | X Close |

Fetch Records

*Some columns may be added to this inventory for automated rule execution.

Search in Rules

- EXCLUDE - Decommissioned Application [Remove Retain/Remove Override]
- EXCLUDE - Retired Application - Was override to exclude [Remove Override]
- EXCLUDE - Retired Application - No indicators of continued usage [Remove Retain]
- EXCLUDE - Operate Application - Previously manually excluded, no longer meets criteria [Remove Override]
- INCLUDE - Operate Application - Previously manually included, now meets criteria [Add Retain]
- EXCLUDE - Operate Application – Entry no longer meets criteria [Remove Retain]

Figure 10

Applicable Rows *

EXCLUDE - Decommissioned Application [Remove Retain/Remove Override] x
EXCLUDE - Retired Application - Was override to exclude [Remove Override] x
EXCLUDE - Retired Application - No indicators of continued usage [Remove Retain] x   +8 ▷

| | | | | ✓ Fetch Records | | 🗎 Save Applied Rules | | X Close |

Selected rows count: 65    |◁ ◁ 1 2 3 4 5 ▷ ▷| 10⌄              Total records: 65, Total pages: 7

| Selection | Automated_Action | Rationale | Application ID | Application Name | Application LOB | TG0 | Application State | Confirm |
|---|---|---|---|---|---|---|---|---|
| All ⌄ | | | | | | | | All |
| ☑ | Auto Remove | Application 3xx0 Decommissioned | 3x20 | CSR – Credit Surveillance Report | CT | Risk and Forecasting Solutions | Decommissioned | Overrid |
| ☑ | Auto Remove | Application 1xx31 Decommissioned | 16xx1 | CAS | AWM | AM:Fixed Income & Liquidity | Decommissioned | Overrid |
| ☑ | Auto Remove | Application 1xx73 Decommissioned | 1xx3 | Anderson Financial System | AWM | AM:Global Equity Technology | Decommissioned | Overrid |
| ☑ | Auto Remove | Application 1xx89 Decommissioned | 1xx9 | STPWeb | AWM | AM:Fixed Income & Liquidity | Decommissioned | Overrid |

🗎 Apply & Save          X Cancel

| EI-0 | EI-01 | Country ▾ | LOB ▾ | Legal En ▾ | Legal En Nam ▾ | TGO ▾ | App ID ▾ | App Name ▾ | TPO ID ▾ | AppLE List | LE Details | AppLE Request | EI Group Details |
|---|---|---|---|---|---|---|---|---|---|---|---|---|---|
| EI-02 | EI-03 | | | | | | | | | | | | |
| EI-04 | EI-05 | Legal Entity App Count | | Entity Interest App Count | | Legal Entity Count | | County Inventory App Count | | | | Deployment ID Count | |
| EI-06 | EI-07 | 4206 | | 58578 | | 218 | | 5326 | | | | 7306 | |
| EI-08 | EI-09 | | | | | | | | | | | | |
| EI-10 | EI-11 | ▦ Country Inventory 1510 | | ▦ Entity Interest Details 1512 | | ▦ SEAL Details | | | | ▦ RADAR Details | | | |
| EI-12 | EI-13 | Country | App ID | ◁ Details | App Name | App State | Confirmed Membership | App LOB | Reporting CIO LOB | TGO | #Users by LE | AppLE Request | |
| EI-14 | EI-15 | FRANCE | 810 | ◁ | Asset Based | Operate | - | CB | CB | CB Wholesale | | ◁ | |
| EI-16 | EI-17 | GERMANY | 810 | ◁ | Asset Based | Operate | - | CB | CB | CB Wholesale | | ◁ | |
| EI-18 | EI-19 | HONG KONG | 810 | ◁ | Asset Based | Operate | Retain | CB | CB | CB Wholesale | | ◁ | |
| EI-20 | | INDIA | 810 | ◁ | Asset Based | Operate | Retain | CB | CB | CB Wholesale | | ◁ | |
| | | PHILIPPINES | 810 | ◁ | Asset Based | Operate | Retain | CB | CB | CB Wholesale | | ◁ | |
| | | POLAND | 810 | ◁ | Asset Based | Operate | Retain | CB | CB | CB Wholesale | | ◁ | |
| 1520 | | SINGAPORE | 810 | ◁ | Asset Based | Operate | Retain | CB | CB | CB Wholesale | | ◁ | |
| | | U.K. | 810 | ◁ | Asset Based | Operate | Retain | CB | CB | CB Wholesale | | ◁ | |
| | | AUSTRALIA | 1420 | ◁ | Sapphire | Operate | Retain | CB | CB | CB Wholesale | | ◁ | |
| | | CHINA MAIN | 1420 | ◁ | Sapphire | Operate | Retain | CB | CB | CB Wholesale | | ◁ | |
| | | DENMARK | 1420 | ◁ | Sapphire | Operate | Retain | CB | CB | CB Wholesale | | ◁ | |

| Mode | Critical Ops | Selection | Repo:Tri-Party | | Audit Trail | Add Inclusions | | Load Data | Attest |
|---|---|---|---|---|---|---|---|---|---|

Selected rows count: 0    Money Market Mutual Funds 2 3 4 5 ◁ ▷ ◁| 10 ∨     Total records:459, Total pages: 46 Last query took 27,693 seconds.

| Application ID | Application Name | Confirmed Membership All ∨ | Pending Review? All ∨ | Reason All | Meets Criteria? All | Proposed Membership All |
|---|---|---|---|---|---|---|
| | Customer and Bank Data | Retain | N | | Y | Retain |
| 4xx0 | fxXpress | | Y | Meet criteria | Y | Retain |
| 6xx0 | GMI | | Y | Meet criteria | Y | Retain |
| 6xx0 | IPB Online | | Y | Meet criteria | Y | Retain |
| 8xx0 | Fixed Income International Settlement Cleara | Retain | N | | Y | Retain |
| 82x0 | Kapital | | Y | Meet criteria | Y | Retain |
| 87x0 | MHS – Message Handling System | | Y | Meet criteria | Y | Retain |
| 9xx0 | Napoli Regional | | Y | Meet criteria | Y | Retain |
| 10xx0 | OLYMPIC | | Y | Meet criteria | Y | Retain |
| 1xx40 | OPICS | | Y | Meet criteria | Y | Retain |

Payments:Retail
Payments:Wholesale
Post Office card account (Poca) (JPMEL)
Prime Brokerage    1710
Repo:Tri-Party
WM: Digital, Doc Mgmt and CMW Tech
PTT-Sec Processing-CTT FIT (Sxx8)
Mkts-Macro-Rates (Sxx1)
Banking-Global Client Access (Sxx68)
PTT-Sec Processing-Equities (Sxx07)
WM: Operations & Client Service
PTT-Sec Processing-CTT FIT (Sxx8)

Figure 17

SYSTEM AND METHOD FOR IMPLEMENTING CUSTOMIZABLE RULES FOR ASSOCIATING LEGAL ENTITIES OR OTHER ATTRIBUTES WITH APPLICATIONS AND DEPLOYMENTS

CROSS REFERENCE TO RELATED APPLICATIONS

The application claims priority to U.S. Provisional Application 62/955,503, filed Dec. 31, 2019, the contents of which are incorporated herein in its entirety.

FIELD OF THE INVENTION

The invention relates generally to a customizable rule based system and method for associating legal entities and other attributes or categories with applications and/or deployments.

BACKGROUND OF THE INVENTION

Large global companies are usually composed of distinct separate legal entities despite having a unified global presence. These companies such as financial institutions are typically regulated on an entity basis rather than on a country basis. Particularly outside the United States, regulators expect to see governance and reporting on a legal entity basis. Additionally, regulators often define specific groupings of applications for additional regulation. Examples of this may include Bring Your Own Device applications or applications with data stored overseas or in a cloud hosting environment.

Generally, applications need to be associated with legal entities (LE) for a variety of different reasons relating to users in the LE, infrastructure in the LE and regulatory criteria for the LE which the application falls under, etc. The rules for each LE are different and therefore need to be carefully defined, oftentimes requiring a myriad of data sources to feed into those rules. Current methodologies require a manual process. For large international entities, this requires dedicated manpower and resources to maintain the accuracy of this information which leads to inefficiencies and potential for mistakes and inaccuracies. In addition to legal entities, other attributes may need to be associated with applications and deployments and have the same challenges.

These and other drawbacks exist.

SUMMARY OF THE INVENTION

According to one embodiment, the invention relates to a system that applies customized rules to associate legal entities with applications and deployments. The system comprises: an input configured to receive data from one or more source systems; a memory structure configured to storage and manage data received from the one or more source systems; and a rules engine comprising a computer processor coupled to the input and the memory structure, the computer processor programmed to perform the steps of: applying one or more system level rules and one or more configurable attribute rules that link data from the one or more source systems and define one or more rules for each attribute; automatically generating, responsive to the one or more system level rules and the one or more configurable attribute rules, a set of resulting mappings that map one or more applications and application deployments to an attribute, wherein the set of resulting mappings comprise at least one of: automated mappings with high confidence level; automated mappings of low confidence level and one or more mapping predictions that require additional input; and displaying, via an interactive user interface, the set of resulting mappings that graphically associate the one or more applications and application deployments to a corresponding attribute.

According to one embodiment, the invention relates to a method that applies customized rules to associate legal entities with applications and deployments. The method comprises the steps of: applying, via a rules engine comprising a computer processor, one or more system level rules and one or more configurable attribute rules that link data from the one or more source systems and define one or more rules for each attribute; automatically generating, responsive to the one or more system level rules and the one or more configurable attribute rules, a set of resulting mappings that map one or more applications and application deployments to an attribute, wherein the set of resulting mappings comprise at least one of: automated mappings with high confidence level; automated mappings of low confidence level and one or more mapping predictions that require additional input; and displaying, via an interactive user interface, the set of resulting mappings that graphically associate the one or more applications and application deployments to a corresponding attribute.

The attributes may include legal entity designations and the attribute rules comprise country and legal entity rules. The attributes may also include resolution and recovery categories and others.

The system may include a specially programmed computer system comprising one or more computer processors, interactive interfaces, electronic storage devices, and networks. The computer implemented system and method described herein provide unique advantages to entities, users and other participants, according to various embodiments of the invention. Current tools may have the ability to store fields such as legal entity with an application. However, such tools lack the ability to provide automation and generation of proposals. These tools further lack the ability to define groups by legal entity (LE), clean-up of source data, etc. An embodiment of the present invention is directed to allowing permissioned legal entity managers to define and automatically apply rules to derive an association of an application with a legal entity. This may further extend to other attributes including resolution and recovery categories. An embodiment of the present invention achieves improved efficiencies, streamlined processes and the ability to review and/or override as needed. As data sources and data quality improves, the scope of automatic acceptance may be increased and further enhanced. An embodiment of the present invention seeks to ensure compliance with regulatory requirements that are based on understanding where data is being used and further ensure that requirements are aligned at the legal entity level. Ensuring compliance would also avoid fines and other penalties.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 3 is an exemplary screenshot of an interactive user interface, according to an embodiment of the present invention.

FIG. 4 is an exemplary screenshot of an interactive user interface, according to an embodiment of the present invention.

FIG. 5 is an exemplary screenshot of an interactive user interface, according to an embodiment of the present invention.

FIG. 6 is an exemplary screenshot of an interactive user interface, according to an embodiment of the present invention.

FIG. 7 is an exemplary screenshot of an interactive user interface, according to an embodiment of the present invention.

FIG. 8 is an exemplary screenshot of an interactive user interface, according to an embodiment of the present invention.

FIG. 9 is an exemplary screenshot of an interactive user interface, according to an embodiment of the present invention.

FIG. 10 is an exemplary screenshot of an interactive user interface, according to an embodiment of the present invention.

FIG. 11 is an exemplary screenshot of an interactive user interface, according to an embodiment of the present invention.

FIG. 13 is an exemplary screenshot of an interactive user interface, according to an embodiment of the present invention.

FIG. 15 is an exemplary screenshot of an interactive user interface, according to an embodiment of the present invention.

FIG. 16 is an exemplary screenshot of an interactive user interface, according to an embodiment of the present invention.

FIG. 17 is an exemplary screenshot of an interactive user interface, according to an embodiment of the present invention.

DETAILED DESCRIPTION OF THE PREFERRED EMBODIMENT(S)

Figure 1:
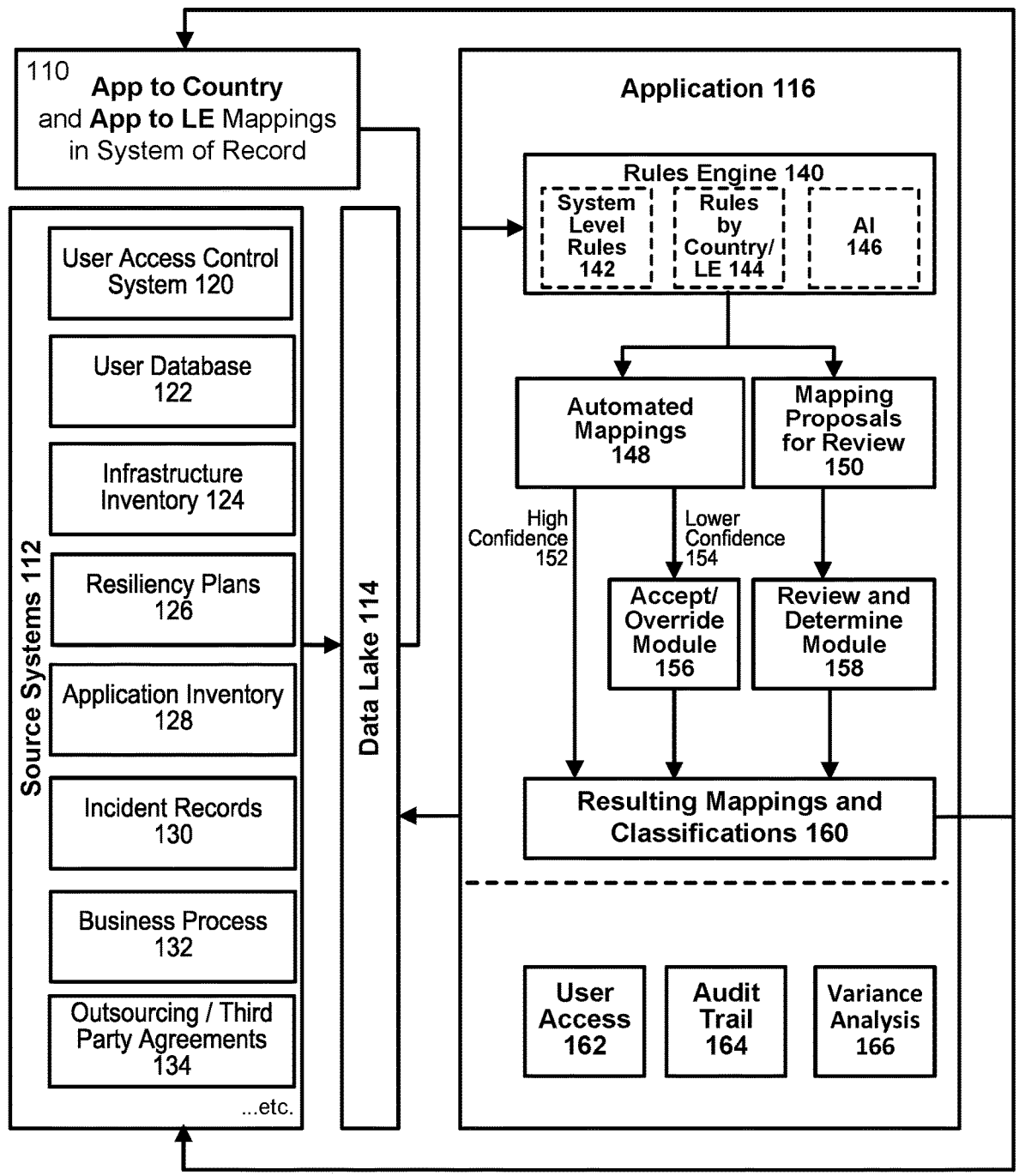
FIG. 1 is an exemplary system diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to enabling users, e.g., permissioned legal entity managers, to define rules to derive an association of an application/deployment with a legal entity. For example, an embodiment of the present invention may implement a rules engine to generate associations and mappings. An application manager may then be presented with an option to accept suggested associations or perform an override. Once a legal entity is assigned and confirmed, the application may be published to a system of record. Due to the vast amount of applications and entities available, an embodiment of the present invention provides automation with the ability to perform overrides and reviews. The results of the classification may then be stored in a system of record or other storage component or system.

The innovative system may generate a mapping from applications to legal entity based on a robust process. As required by regulators, a direct output from the system may be used to maintain such a record. By allowing different rule sets by legal entity, applications may be segregated by various regulatory and other requirements (e.g., internal and external) using a rules based approach. For example, rules may be defined for each country and/or LE by permissioned users. In addition, multiple distinct rulesets may be developed and applied. This enables governance and enforcement of additional regulations and/or controls where required, thereby facilitating compliance with regulations.

Other systems may consume the resulting mappings and create governance reporting, internal reports and/or external reports based on legal entity and groupings of applications. For example, an embodiment of the present invention may be directed to identifying applications which may have Legal Entity regulatory impact in the event of an issue. In addition, the innovative system may identify applications in critical business flows. Other use cases may involve generating incident reports to regulators on an entity basis; reporting to Board and Management Committees on an entity basis; reporting on applications which fall into specific regulations; targeting particular groups of applications for threat assessment for a country or legal entity; and segregating access to applications for particular legal entities. Further, additional use cases may involve reports of critical dependencies for a legal entity in the event of data center failure, cost allocation by legal entity and monitoring cross border data usage. Other use cases and examples may be implemented in accordance with the various embodiments of the present invention.

For example, a global company may have a presence throughout the United States, Asia and Europe. While the global company is regarded as a single company, it is actually composed of different legal entities where each legal entity is a separate company. In this scenario, regulators may view each legal entity as a different company. For example, the global company may have three different legal entities (e.g., a bank branch entity, a securities entity and an asset management entity) in their Asia division. In addition, the global company may have technology located and deployed in various countries and jurisdictions. This may further involve access to datacenters and other technology assets and resources. An embodiment of the present invention recognizes that different regulators will impose different sets of requirements. For example, a regulatory in one country may require segregated governance committees for the securities side and the bank side. Another country may not impose this requirement. Accordingly, an entity would need to comply with various regulations based on the corresponding legal entity designation for applications and deployments.

An embodiment of the present invention is directed to connecting multiple data sources within a corporate entity and automatically determining an appropriate legal entity for each application or deployment based on rules that define each legal entity and uniquely apply the criteria for each legal entity. For example, an application may be associated with a particular securities entity of a global entity. The application may also include deployments which may represent individual instances of the application. An embodiment of the present invention applies rules that connect legal entities to applications and then generates a level of certainty or confidence. The level of certainty or confidence may be based on various factors. For example, a high level of confidence may be based on common users, common applications and deployments, etc. Based on the level of certainty or confidence, a user may then accept the decision or provide an input or adjustment to the decision. Accordingly, a confidence level above a predetermined threshold may result in an automatic mapping or tagging. An embodiment of the present invention may then feed the data back into a system of record. The data may then be used to improve the decision-making process and thereby boost certainty and confidence in the next mappings, resulting in an increased confidence level.

An embodiment of the present invention may segregate applications at the legal entity level. This may involve breaking down applications into different groups based on regulatory requirements. Accordingly, the innovative system may then generate reports for regulators, governance committees, etc. An embodiment of the present invention may be integrated with other systems to segregate their reporting. By segregating applications by legal entity, an embodiment of the present invention may bring together the corresponding datasets and analyze the datasets for consistency, validation, issue spotting, clean-up and/or other actions and functionality.

In addition, the segregation or classifications may further define how to manage data, conduct business, perform interactions and communications, etc. For example, an application may be associated with a legal entity that is subject to regulatory requirements for a certain country. The country may have restrictions on how to handle confidential information, which may be different from the way the global entity treats confidential information. The rules may be applied to ensure data is handled properly pursuant to country-specific regulatory requirements. For example, the applications may potentially cause an incident, which would need to be reported to regulators based on the classifications determined by an embodiment of the present invention.

An embodiment of the present invention recognizes that entities are generally regulated on an entity-basis rather than a country basis and this is particularly true outside the United States. An embodiment of the present invention is directed to mapping applications/deployments to legal entities and further identifying classifications of various groups or categories within the legal entities to then apply varying sets of regulations as well as other restrictions and/or requirements, etc.

An embodiment of the present invention is directed to regional compliance by automatically deriving associations between applications and deployments with legal entities. An embodiment of the present invention may also apply to other use cases, including deriving associations between applications and deployments with Resolution and Recovery categories. The framework of an embodiment of the present invention is adaptable to various use cases and scenarios.

FIG. 1 is an exemplary system diagram, according to an embodiment of the present invention. An embodiment of the present invention may implement a definable rule based system to derive an association of a legal entity with an application and propose actions to a legal entity manager. A legal entity (LE) manager may be presented with an ability to override. In addition, an embodiment of the present invention may support an automated acceptance of actions. An embodiment of the present invention may provide full automation and further facilitate integration with other data sources as well as artificial intelligence (AI) as an input into the rules. An embodiment of the present invention is directed to improved automation where applications may be associated with a legal entity based on predefined rules. For example, an embodiment of the present invention may receive groups or batches of applications and then automatically perform an LE association for each application or groups of applications.

As shown in FIG. 1, Source Systems 112 may store data in Data Lake 114. Mappings 110 and data from Data Lake 114 may be received by Application 116. Application 116 may include Rules Engine 140, which implements System Level Rules 142, Rules by Country/LE 144 and AI 146. Rules Engine 140 may generate mappings, represented by 148 and mapping proposals for review shown by 150. Mappings of high confidence 152 may be forwarded to Resulting Mappings and Classifications 160. Mappings of lower confidence 154 may be sent to Accept/Override Module 156 where may a decision may be accepted or overridden. Mapping proposals for review may be sent to Review and Determine Module 158 and then stored as Resulting Mappings and Classifications 160. Resulting Mappings and Classifications may also include entity interest (EI) classifications. Additional features may be represented by User Access 162, Audit Trail 164 and Variance Analysis 166.

EI classifications may represent different regulatory classifications or other classifications defined as relevant. Publishing resulting mappings and classifications allows various downstream processes to then look at applications that map to specific regulatory criteria.

As shown in FIG. 1, System consumes existing LE mappings represented by 110 (which may be empty for a first run) and data from a variety of Source Systems 112. Source Systems 112 may include user access control system 120 (e.g., permissioned applications), user database 122 (e.g., user location, business line, employing entity, etc.), infrastructure inventory 124 (e.g., assets, location, cost centers, etc.), resiliency plans 126 (e.g., location, business line, used applications, etc.), application inventory 128 (e.g., business line, critically owned LE, function etc.), incident records 130 (e.g., application, impacted country/LE, severity, etc.), business process 132 (e.g., application mapping to business functions, etc.), outsourcing/third party agreements 134, etc. The source system data may first stored in a data lake, represented by 114, to allow historic data to be maintained. Data lake may represent a system or repository of data stored in natural/raw format including structured and unstructured data.

Rules Engine 140 may process input data using multiple categories of rules to interpret source data (including changes) and determine application linkage to country and legal entity. Categories of rules may include System Level Rules 142, Rules by Country/LE 144 and AI 146. System Level Rules 142 may include rules which link data from different source system, rules common to all countries and/or LEs, and/or rules which denote material changes to source data, etc. For example, System Level Rules 142 may represent rules that are hard-coded into the system. This may relate to how the system parses each of the source systems in a data lake, for example, and how it connects those together which may then provide a base criteria of applications for a country or legal entity.

Rules by Country/LE 144 may include rules that are defined for each country and/or LE. There may be multiple distinct rulesets. In addition, access defining these rules may be limited to a designated country and/or LE approvers. An embodiment of the present invention provides flexibility and further support the addition of source systems where a user may select from the data in the source system to then classify based on legal entity. Accordingly, an embodiment of the present invention may provide the ability to customize rules through an interactive interface. For example, the rules may be customized based on the data in the source systems.

AI 146 may represent artificial intelligence and/or machine learning that may be applied to predict and/or learn Country and/or LE association.

Rules Engine 140 may generate outputs including: a new set of applications mapped to countries and applications mapped to legal entities. This may include reasons that form the basis for the mappings and/or changes to existing mappings. For example, mappings may be split into multiple categories which may include automated mappings with high confidence level 152; automated mappings with lower confidence level 154 which may be received at Accept/Override Decision 156; and mapping proposals requiring manual review, represented by 158, and received by Review and Determine 158. Other categories may be implemented.

Designated reviewers may decide to approve or override low confidence automated items, and make decisions on manual items. Decisions may be recorded with reasoning/basis, timestamp, and attributions. Other data may be collected and applied. Other systems may use these decisions to then improve automated proposals and develop confidence levels in future. Designated reviewers may be LE representatives, application specialists, etc.

Country/LE approver may publish results for their country/LE to a System of Record for consumption by other systems, reporting, etc. In addition, quality suggestions derived by the application may go back to source systems to improve data quality.

Application modules may include permission application usage (e.g., country/LE approvers, designated reviewers, etc.) represented by User Access 162; view of audit trail of decisions represented by Audit Trail 164; ability to perform variance analysis between arbitrary points in time represented by Variance Analysis 166. With Variance Analysis 166, an embodiment of the present invention may compare data from multiple points in time to view any changes or variance in data. Application data may be stored back in data lake or other storage component.

Figure 2:
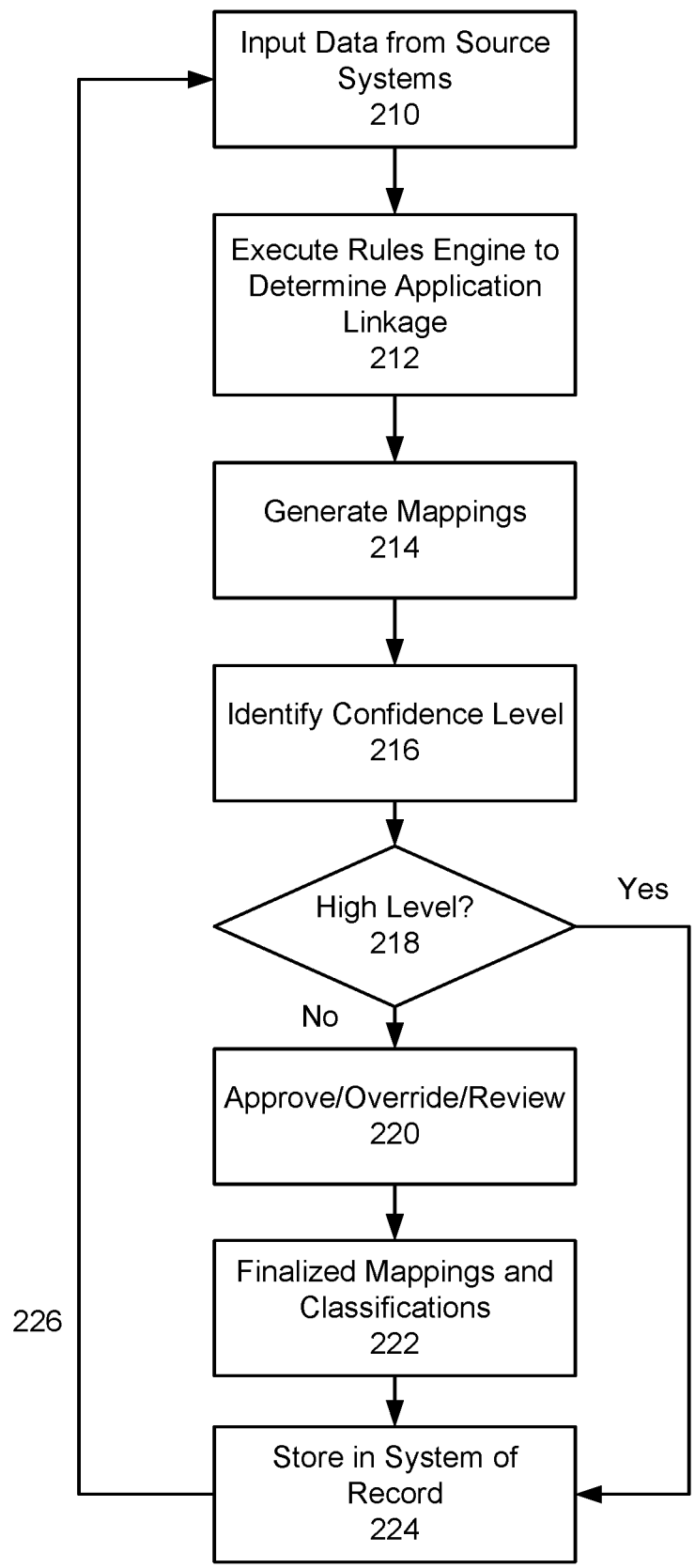
FIG. 2 is an exemplary flowchart, according to an embodiment of the present invention.

FIG. 2 is an exemplary flowchart, according to an embodiment of the present invention. At step 210, input data from source systems may be identified. Data may be managed and maintained in a storage system, e.g., Data Lake. At step 212, a rules engine may be executed to determine application linkage. For each application, the rules engine may apply rules to determine automated mappings and mappings for review. The Rules Engine may apply customized rules including system level rules, rules by country and/or legal entity as well as AI/ML. At step 214, a set of mappings may be generated. Mappings may include applications mapped to countries and applications mapped to legal entities. Applications may also refer to deployments. In addition, the set of mappings may identify reasons/rationale for the mappings, changes to existing mappings and other data. At step 216, a corresponding confidence level for mappings may be identified. For example, high or low confidence levels may be applied. Confidence levels may be determined by predetermined thresholds. If the confidence level is high (at 218), the application data may be stored in a system, such as a system of record (SOR), at step 224. If confidence level is determined to be low (at 218), additional review may be required which may involve approval, override, modification, etc., at step 220. In other variations, additional more granular levels may be identified. At step 222, finalized mappings and classifications may be ready for publishing. Classifications may also include entity interest (EI) classifications. For example, mappings and classifications may be published to a SOR. In addition, mappings and classifications may be gathered together and then published as a set. Other variations may be applied. As shown by 226, a feedback may be applied back to source systems to improve data quality. This feedback loop may involve taking in multiple source data, connecting the data together with rules, analyzing decisions, determining areas of the source data which may be improved, and feeding those improvement back to the source data to clean up and refine the data. This serves to address significant challenges with disparate sets of source data having data quality issues. According to an exemplary scenario, multiple countries/legal entities may run this process in parallel as well as simultaneously. For example, an embodiment of the present invention may be applied in Japan at the same time the process is applied in Australia.

While the process of FIG. 2 illustrates certain steps performed in a particular order, it should be understood that the embodiments of the present invention may be practiced by adding one or more steps to the processes, omitting steps within the processes and/or altering the order in which one or more steps are performed.

FIGS. 3-17 represent exemplary illustrations of screenshots. Other functions and features may be implemented in accordance with the various embodiments of the present invention. The illustrations shown in FIG. 3-17 are exemplary only and do not limit the present invention in any manner.

FIG. 3 is an exemplary screenshot of an interactive user interface, according to an embodiment of the present invention. For each country, there is a fully automated country inventory ("AU-Country Inventory") which may be derived from Source Systems and scopes in various applications associated with the country. This baseline country inventory may become a set of applications for which the different rules for associating applications to legal entity are applied. For example, this may refer to rules defined for each country/LE by permissioned users.

Figure 4:
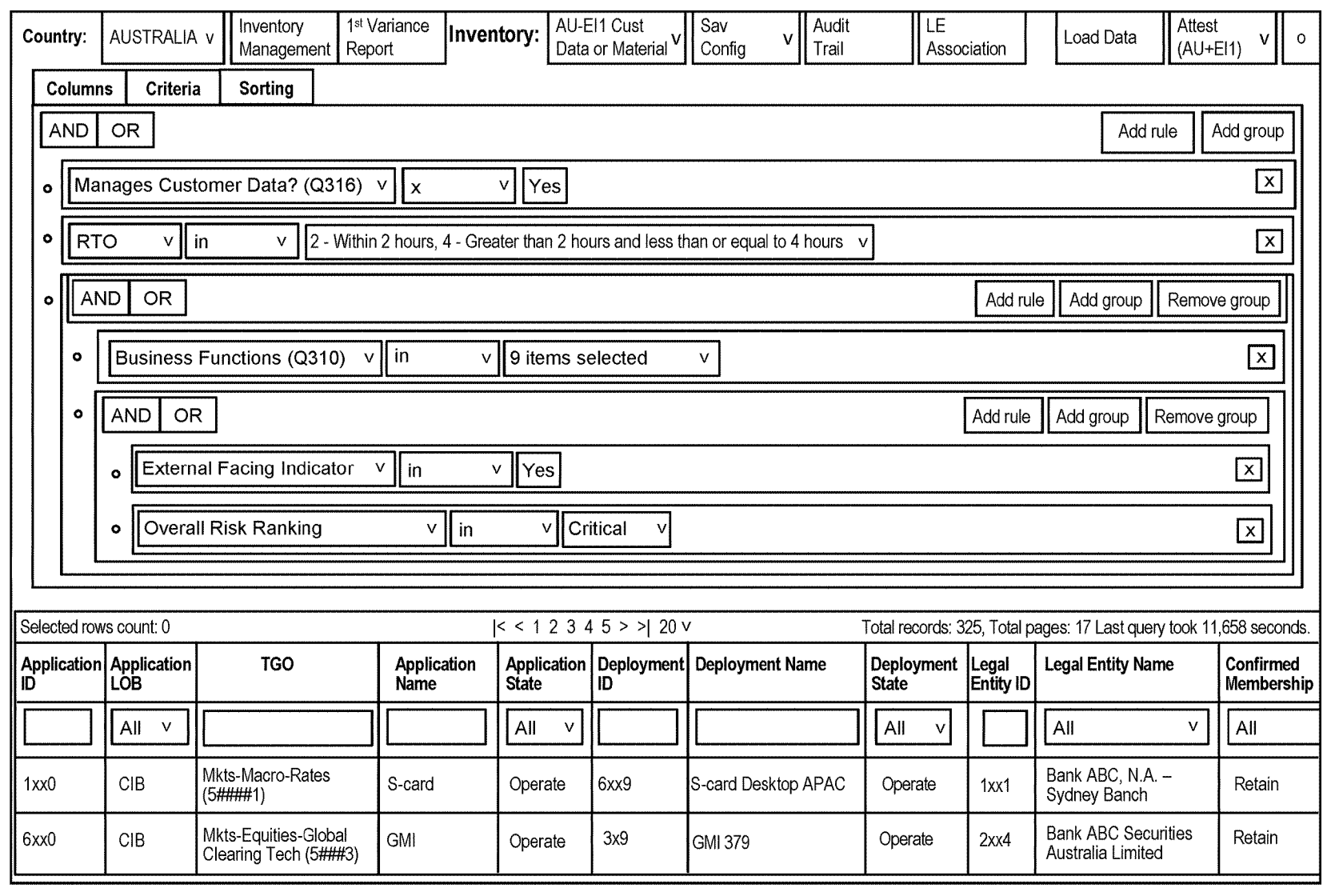

FIG. 4 is an exemplary screenshot of an interactive user interface, according to an embodiment of the present invention. From an "Inventory Menu," different rules for associating applications to legal entity may be selected. This may be referred to as "Entity Interest" groups and there may be multiple as shown in FIG. 5. These may be defined and editable by a designated country/LE manager.

As shown in FIG. 5, the exemplary screenshot may provide a view for a designated country/LE manager who has the ability to define the rules. The selection criteria available may be based on fields in Source Systems and derived fields may be created by the application. The matching applications for the criteria may then be shown as a grid, such as the exemplary interface of FIG. 4.

FIG. 6 is an exemplary screenshot of an interactive user interface, according to an embodiment of the present invention. The exemplary screenshot may be utilized by a reviewer to approve or override low confidence automated items and make decisions on manual items. The filterable "Pending Review?" shows Y where the reviewer needs to manually review. The system may provide a reason for the review and also provide a proposal. A user interaction (e.g., a right click) on the row representing an application allows the reviewer to accept the proposal and/or to override the decision, as well as additional actions such as opening additional reports which give more data the reviewer may want to refer to.

Other features may include filters that may be applied to the Reason (and other) columns to facilitate bulk reviewing of similar cases (e.g., decommissioned applications). The Selection checkbox column may be used to allow the same action to be applied to multiple applications at once. When a reviewer has finished a review session, the "Attest" button allows them to mark that review as complete.

FIG. 7 is an exemplary screenshot of an interactive user interface, according to an embodiment of the present invention. The "Automated Rules" button allows Acceptance and/or Override of automated mappings by the reviewer. Interacting with "Automated Rules" brings up a window which shows the lower confidence automation requiring accept/override decision. For example, items with a check in the selection column may have the automation rules applied once the Apply button is clicked.

FIG. 8 is an exemplary screenshot of an interactive user interface, according to an embodiment of the present invention. As shown in FIG. 8, an Audit Trail window shows actions which have been applied, whether automated or by user decision. Details of the changes, who they were done by (or whether automated), when they were done, and comments on the reason for the action may be captured. Other actions may include filtering by application, LE, person, etc. to access and view history—e.g., on all changes applied to a particular application.

FIG. 9 is an exemplary screenshot of an interactive user interface, according to an embodiment of the present invention. FIG. 1 illustrates Automated Mappings 148 which determines high confidence 152 or lower confidence 154. Upon a determination of lower confidence 154, an embodiment of the present invention may perform an Accept/Override decision 156. The decision may then provide Resulting Mappings and Classifications 160.

Automated Rules feature may be represented at 910 in FIG. 9. Selecting Automated Rules, an embodiment of the present invention may display a set of rules. A user may select which rules to apply and then initiate a Fetch Records action. The Save Automated Rules button may then allow the selected rules to be saved for next time.

FIG. 10 is an exemplary screenshot of an interactive user interface, according to an embodiment of the present invention. As shown in FIG. 10, Applicable Rules may be selected. 1010 displays currently applicable rules in summary. In addition, an ability to select or unselect rules may be provided at 1012. A user may save changes to selected rules with the Save Applied Rules button. A user may see which records would be affected by the rules using the Fetch Records button, which also provides options to apply the rules (FIG. 11).

FIG. 11 is an exemplary screenshot of an interactive user interface, according to an embodiment of the present invention. FIG. 11 illustrates automated mappings. As shown in FIG. 11, the user may be presented with the result of applying the mappings to the dataset. All results may be selected by default and the user may choose "Apply and Save" to apply all the resultant mapping. In addition, the user may deselect mappings they do not want before applying. Further, the user may cancel to abort.

Figure 12:
FIG. 12 is an exemplary screenshot of an interactive user interface, according to an embodiment of the present invention.

FIG. 12 is an exemplary screenshot of an interactive user interface, according to an embodiment of the present invention. FIG. 12 illustrates metadata for inventories.

For example, a country may have a number of different inventories, each with its own criteria. Downstream systems may consume these inventories from systems of record. An embodiment of the present invention may add metadata which helps downstream users understand what each inventory represents and who to contact.

As shown in FIG. 12, an inventory (at 1212) may be selected for a particular country (at 1210). Details may be provided at 1214 including Short Name, Description, Usage, Information Security Management, Technology Management Office and Executive Management.

For example, Entity Interest Inventories may be based on criteria such as regulatory criteria. In addition, a superset of all inventories may be supported. The superset may represent the mappings from all the Entity Interest Inventories for a country or geographic region together. Other filters, restrictions and/or conditions may be applied.

In addition, an embodiment of the present invention may include the ability to add individual mappings directly to a category for the case situations where it is desirable to add additional Application Deployment to Legal Entity mappings for a country which do not match the specific Entity Inventory Criteria.

Figure 13:
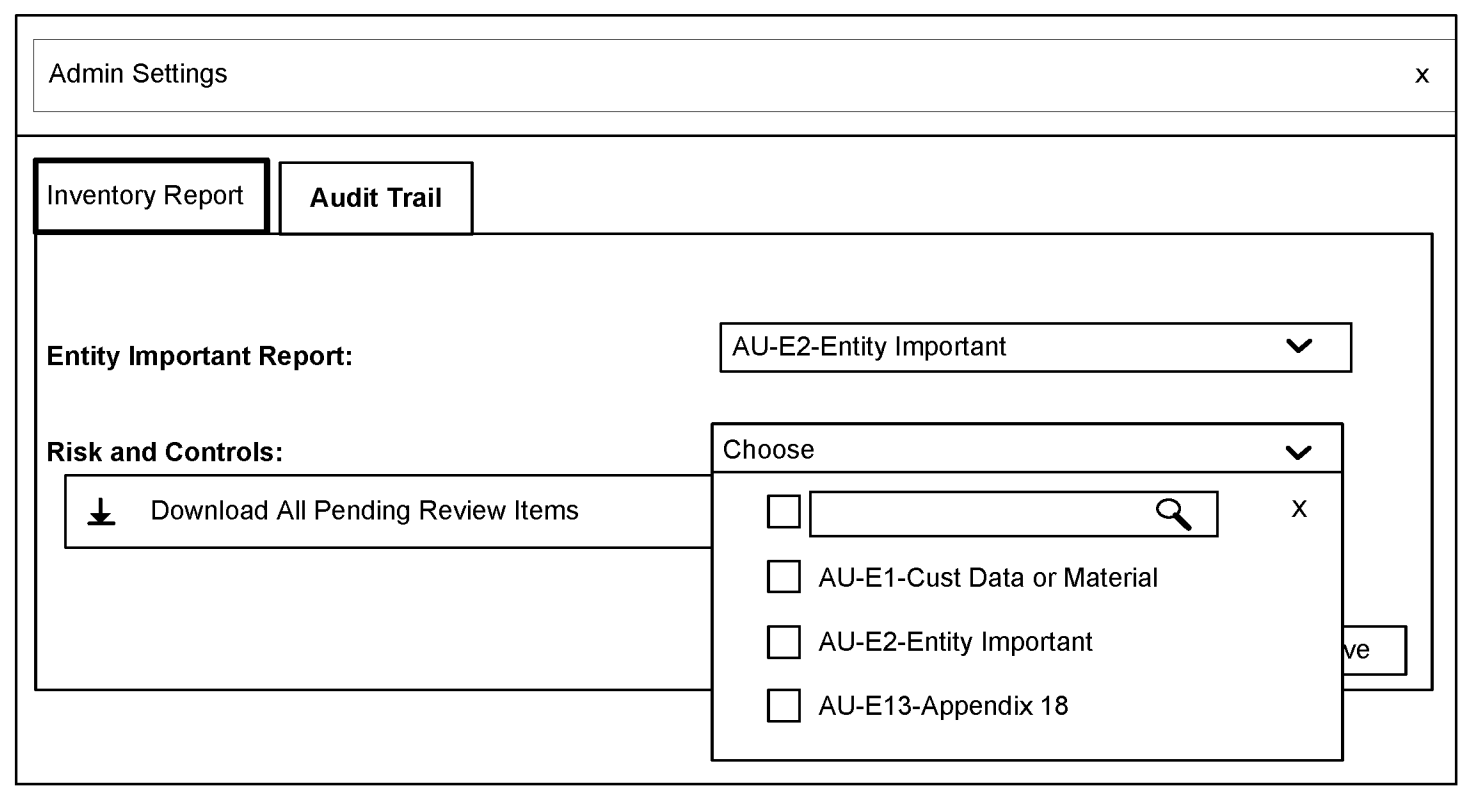

FIG. 13 is an exemplary screenshot of an interactive user interface, according to an embodiment of the present invention. FIG. 13 illustrates an Inventory use case. As shown in FIG. 13, a file of applications/deployments may be generated that includes pending decisions to be made about mappings. This allows users to review offline or use as a basis for creating reports (e.g., track inventory completion, etc.).

According to an embodiment of the present invention, a country may have a number of different inventories, each with its own criteria. For example, the inventory names and criteria may vary per country.

Some downstream use cases may need a consistent classification which may apply to some or all countries. For example, one common use case may involve knowing all the "Important" applications for a country and its entities. As shown in FIG. 13, "Entity Important" reports may be identified.

Another use case may include knowing which applications to use for a report, such as a global report. In this example, an embodiment of the present invention may include a feature where countries may determine which inventories to use for different use cases.

Figure 14:
FIG. 14 is an exemplary screenshot of an interactive user interface, according to an embodiment of the present invention.

FIG. 14 is an exemplary screenshot of an interactive user interface, according to an embodiment of the present invention. FIG. 14 provides drilldown details.

An embodiment of the present invention may consume data for an application from other systems of record which may be used for display, criteria definition, automation, and creating new data points. An embodiment of the present invention may provide options to view application data in other systems. This may be provided through window 1410. This feature may be represented by a "Show In" feature at 1412. An embodiment of the present invention may provide an option to drill down into the raw data from a data source. This may be shown in a "Details" option at 1414.

For example, the "Show in" feature may include options such as regional compliance report or other identifier. By selecting this feature, for example, an embodiment of the present invention may open a corresponding System of Record to display the information about the application.

According to another example, the "Details" feature may include options such as "Show Incident Data." An embodiment of the present invention may calculate various data points including "#P1 Incidents", which may represent the sum of serious system incidents on this application in the past year affecting the country. "Show Incident Data" may provide the information used for that calculation.

FIG. 15 is an exemplary screenshot of an interactive user interface, according to an embodiment of the present invention. FIG. 15 provides details relating to approved inventories. For example, count information regarding legal entity app count, entity interest app count, legal entity count, country inventory app count and development ID count. Country Inventory details are provided at 1510. Other details may include Entity Interest 1512 and other categories. Impacted inventories may be highlighted at 1520.

An embodiment of the present invention provides an interactive interface to display the published Application Deployment to Legal Entity Mappings. This may include various filtering abilities, such as by country, by line of business, etc. Metadata and criteria for inventories may also be provided. This information may not be restricted and available for all users. Users of this GUI who are not permissioned may request changes by invoking a request from this interface.

Figure 16:
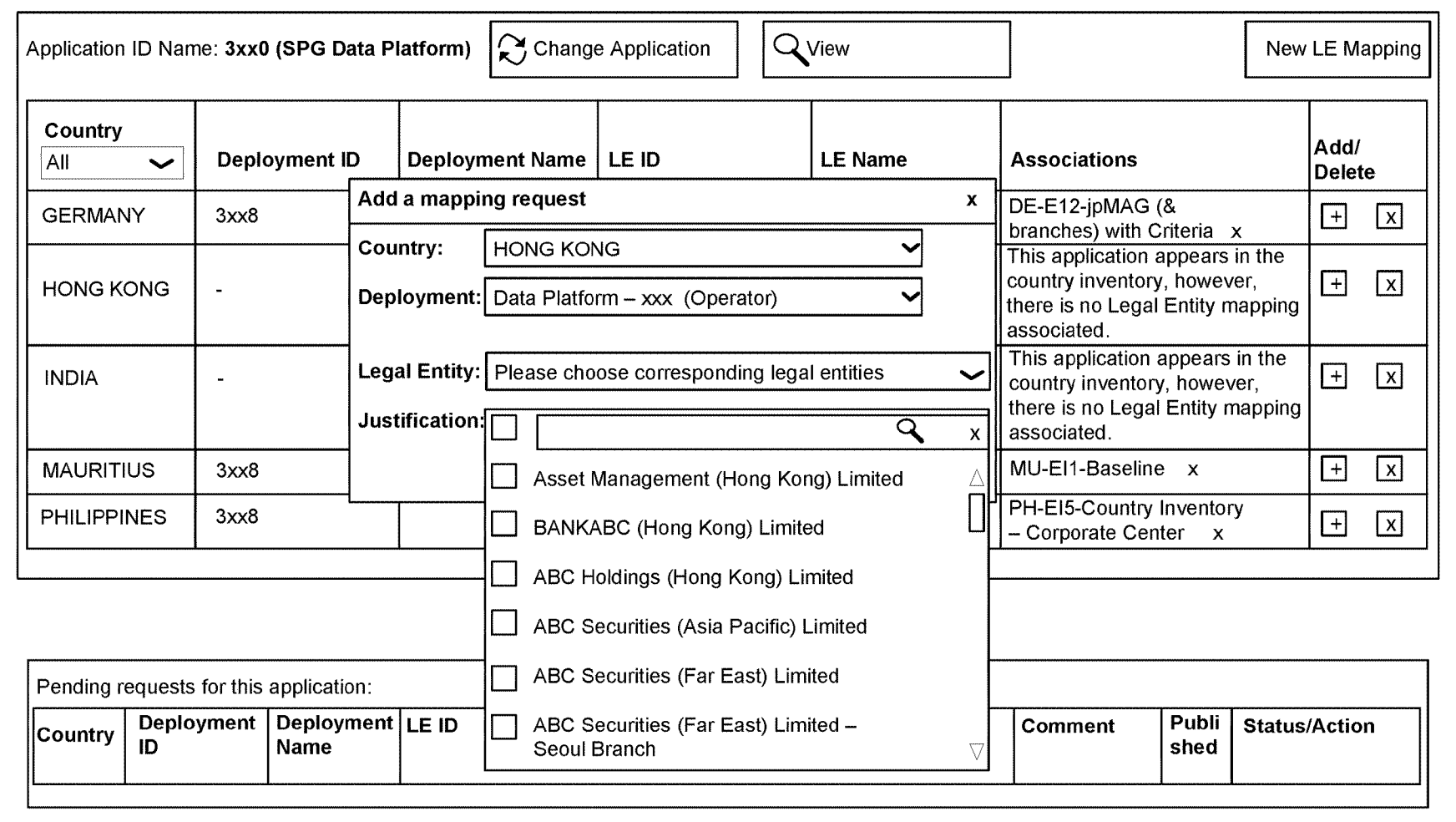

FIG. 16 is an exemplary screenshot of an interactive user interface, according to an embodiment of the present invention. FIG. 16 illustrates an Application Legal Entity Request, such as an "Add a Mapping Request" request where a user may identify country, deployment, legal entity and justification.

An embodiment of the present invention enables people who do not have access (e.g., downstream consumers of the data or application owners) the ability to request changes to Application Deployment to LE Mappings. The requests may be routed to an appropriate user who has permissions to accept or reject the changes.

Where access is controlled by entitlements, a request may allow non-entitled users to suggest mappings which then need to be accepted by an entitled user. For example, a user may click on an add symbol (e.g., "+") to initiate a recommendation for that country. Users may also click on 'New LE Mapping' if the country is not listed. Users may suggest both Country Inventory and Entity Interest mappings. The user may see a notification listing the new suggestions.

FIG. 17 is an exemplary screenshot of an interactive user interface, according to an embodiment of the present invention. FIG. 17 illustrates a Resolution and Recovery embodiment of the present invention.

Various embodiments of the present invention have been directed to an Application to Legal Entity Manager. An embodiment of the present invention may be applied to other scenarios and is not limited to legal entities. An embodiment of the present invention may be used for associating other attributes with applications/deployments. For example, instead of legal entities, an embodiment of the present invention may associate applications to Resolution and Recovery ("RnR") categories.

Resolution and Recovery may refer to planning by an entity, such as a financial institution, if the entity suffers severe losses or failure that could have a systemic impact on a jurisdiction. If an entity runs into major issues, Resolution and Recovery provides details on what needs to be done to sustain a business. A key part of Resolution and Recovery is to understand the critical applications and their association with legal entities. An embodiment of the present invention provides a data driven solution to enable accurate maintenance of data.

For example, an embodiment of the present invention may associate a Country (e.g., Japan, Australia, etc.) and an Inventory (e.g., country inventory, EI0, EI1, EI2, etc.). An embodiment of the present invention may provide an Application list matching criteria. LE manager may then associate relevant LEs with the applications, creating LE mappings.

For example, an embodiment of the present invention may associate a Mode (e.g., critical operations, object of sale, LOB, sub LOB, etc.) and a Selection (e.g., varies depending on the mode selected). An embodiment of the present invention may provide an Application list matching criteria. An exemplary RnR manager may then associate relevant RnR category with the application, creating RnR mappings.

FIG. 17 illustrates a Critical Ops mode example. As shown in FIG. 17, a Critical Ops mode may be identified. A corresponding selection may be made at 1710. In the example of FIG. 17, options may include Money Market Mutual Funds, Payments: Retail, Payments: Wholesale, Post office card account; Prime Brokerage and Repo: Tri-Party.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information.

Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a customizable rule based tool that associates attributes with applications and deployments, the system comprising:
    a memory structure configured to store and manage data received from a plurality of source systems; and
    a rules engine comprising a computer processor coupled to the input and the memory structure, the computer processor programmed to perform the steps of:
        applying one or more system level rules and one or more configurable attribute rules that link data from the one or more source systems and define one or more rules for each attribute;
        automatically generating, responsive to the one or more system level rules and the one or more configurable attribute rules, a set of resulting mappings that map one or more applications and application deployments to an attribute, wherein the set of resulting mappings comprise at least one of: automated mappings with high confidence level; automated mappings of low confidence level and one or more mapping predictions that require additional input; and
        displaying, via an interactive user interface, the set of resulting mappings that graphically associate the one or more applications and application deployments to a corresponding attribute,
    wherein the plurality of source systems includes each of a user access control system, a user database, an infrastructure inventory, resiliency plans, an application inventory, incident records, a business process, and third party agreements.

2. The system of claim 1, wherein the attributes comprise legal entity designations and the attribute rules comprise county and legal entity rules.

3. The system of claim 1, wherein the attributes comprise resolution and recovery categories.

4. The system of claim 1, wherein the set of mappings comprise decision reasons, timestamps and attribution data.

5. The system of claim 1, wherein the computer processor further programmed to perform the step of: providing user access via a user interface based on permission application usage.

6. The system of claim 1, wherein the computer processor further programmed to perform the step of: providing an audit trail of decisions.

7. The system of claim 1, wherein the computer processor further programmed to perform the step of: providing a variance analysis.

8. The system of claim 1, wherein the computer processor further programmed to perform the step of: presenting an option to accept suggested associations or perform an override.

9. The system of claim 1, wherein the rules engine further applies an artificial intelligence or machine learning process to predict and learn attribute association.

10. A method for implementing a customizable rule based tool that associates attributes with applications and deployments, the method comprising the steps of:

applying, via a rules engine comprising a computer processor, one or more system level rules and one or more configurable attribute rules that link data from a plurality of source systems and define one or more rules for each attribute;

automatically generating, responsive to the one or more system level rules and the one or more configurable attribute rules, a set of resulting mappings that map one or more applications and application deployments to an attribute, wherein the set of resulting mappings comprise at least one of: automated mappings with high confidence level; automated mappings of low confidence level and one or more mapping predictions that require additional input; and displaying, via an interactive user interface, the set of resulting mappings that graphically associate the one or more applications and application deployments to a corresponding attribute, wherein the plurality of source systems includes each of a user access control system, a user database, an infrastructure inventory, resiliency plans, an application inventory, incident records, a business process, and third party agreements.

11. The method of claim 10, wherein the attributes comprise legal entity designations and the attribute rules comprise county and legal entity rules.

12. The method of claim 10, wherein the attributes comprise resolution and recovery categories.

13. The method of claim 10, wherein the set of mappings comprise decision reasons, timestamps and attribution data.

14. The method of claim 10, further comprising the step of: providing user access via a user interface based on permission application usage.

15. The method of claim 10, further comprising the step of: providing an audit trail of decisions.

16. The method of claim 10, further comprising the step of: providing a variance analysis.

17. The method of claim 10, further comprising the step of: presenting an option to accept suggested associations or perform an override.

18. The method of claim 10, wherein the rules engine further applies an artificial intelligence or machine learning process to predict and learn attribute association.

* * * * *